United States Patent
Oohira

(10) Patent No.: US 7,471,353 B2
(45) Date of Patent: Dec. 30, 2008

(54) LIQUID CRYSTAL DISPLAY DEVICE

(75) Inventor: Eiji Oohira, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 293 days.

(21) Appl. No.: 11/580,010

(22) Filed: Oct. 13, 2006

(65) Prior Publication Data
US 2007/0097286 A1 May 3, 2007

(30) Foreign Application Priority Data
Oct. 27, 2005 (JP) .............................. 2005-312619

(51) Int. Cl.
*G02F 1/1333* (2006.01)
(52) U.S. Cl. .......................................... 349/58; 349/60
(58) Field of Classification Search .................. 349/58, 349/60
See application file for complete search history.

(56) References Cited

U.S. PATENT DOCUMENTS

| | | | | |
|---|---|---|---|---|
| 6,175,396 B1 * | 1/2001 | Kim et al. | ...................... | 349/58 |
| 6,392,723 B1 * | 5/2002 | Sugiyama et al. | ............. | 349/58 |
| 6,974,242 B1 * | 12/2005 | Chu et al. | .................... | 362/633 |
| 7,277,139 B2 * | 10/2007 | Chung et al. | ................... | 349/58 |
| 7,292,290 B2 * | 11/2007 | Miyagawa et al. | ............ | 349/58 |
| 7,324,173 B2 * | 1/2008 | Li et al. | ......................... | 349/60 |
| 2008/0151138 A1 * | 6/2008 | Tanaka | ......................... | 349/58 |

FOREIGN PATENT DOCUMENTS

JP    2005-77754    8/2003

* cited by examiner

*Primary Examiner*—Sung H Pak
(74) *Attorney, Agent, or Firm*—Reed Smith LLP; Stanley P. Fisher, Esq.; Juan Carlos A. Marquez

(57) ABSTRACT

A liquid crystal display device that includes: a liquid crystal display panel; a backlight unit disposed on the rear surface side of the liquid crystal display panel; and a flexible printed circuit whose end is connected to a terminal portion of the liquid crystal display panel. In the device, the backlight unit includes a frame-shaped mold, the liquid crystal display device includes at least a fixing member for use for fixing the liquid crystal display panel to the frame-shaped mold in an area not including a display area of the liquid crystal display panel, and the fixing member is shaped like a ring, and inside of the ring of the fixing member, the liquid crystal display panel and the frame-shaped mold are disposed. The resulting liquid crystal display device can implement size and profile reduction with ease.

15 Claims, 7 Drawing Sheets

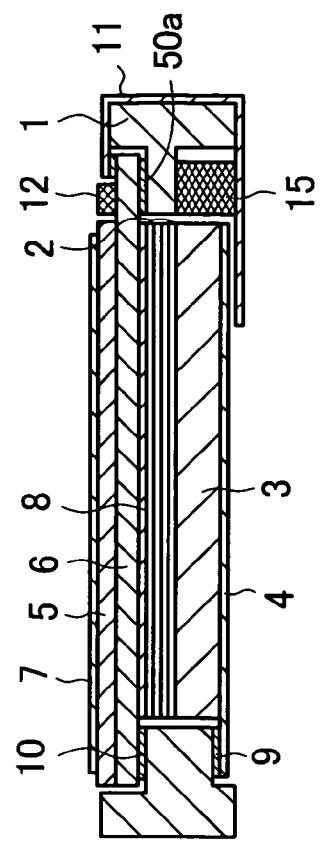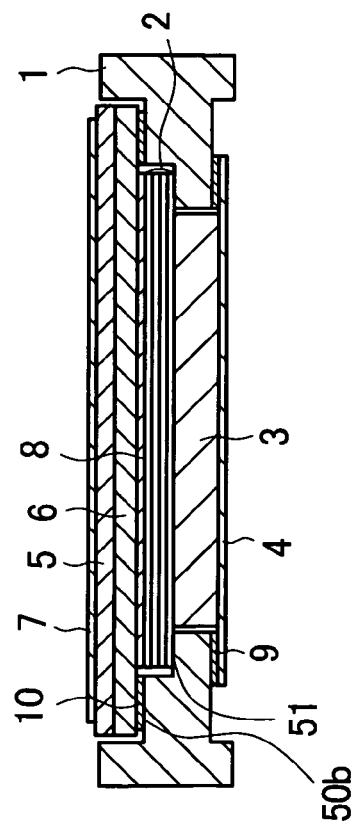
FIG. 2A
FIG. 2B

LIQUID CRYSTAL DISPLAY DEVICE

The present application claims priority from Japanese application JP2005-312619 filed on Oct. 27, 2005, the content of which is hereby incorporated by reference into this application.

BACKGROUND OF THE INVENTION

The present invention relates to liquid crystal display devices and, more specifically, to a technology working effectively when a liquid crystal display panel is fixed to a backlight unit including a light guide plate, an optical sheet group, and others.

A color TFT (Thin Film Transistor) module including a small-sized liquid crystal display panel with subpixels of about 240×320×3 is widely used as a display section of portable equipment, e.g., mobile phone.

Such a liquid crystal display module generally includes a liquid crystal display panel, and a backlight unit that exposes the liquid crystal display panel to light. When the liquid crystal display module is used as a display section as portable equipment such as mobile phone, the backlight unit is configured by a resin-molded frame (hereinafter, referred to as mold), an optical sheet group, a light guide plate, a reflective sheet, and a light source. The optical sheet group and the light guide plate are disposed inside of the mold, and the reflective sheet is disposed below the light guide plate. The light source is disposed on the side surface of the light guide plate, and is exemplified by a white light-emitting diode.

FIGS. 8A to 8B are both a diagram for illustrating a liquid crystal display module of a previous type for use for mobile phones. Specifically, FIG. 8A is a plan view (viewed from the side of a liquid crystal display panel, from the front surface side, or from the side of a viewer), and FIG. 8B is a side view.

The liquid crystal display panel is configured by a pair of glass substrates (5, 6), an upper polarizer 7, and a lower polarizer (not shown). The glass substrates are facing each other with a liquid crystal layer sandwiched therebetween, and the upper polarizer is affixed to these glass substrates. The glass substrate 6 carries thereon a semiconductor chip 12. Such a liquid crystal display panel is disposed in a mold 1.

With the liquid crystal display module of FIGS. 8A and 8B, for implementation of size and profile reduction, a flexible printed circuit (hereinafter, referred to as FPC) 11 is bent and directed to the rear surface side of the backlight unit, and then fixed thereto. The FPC 11 is equipped with electronic components such as resistance and capacitor, and a white light-emitting diode serving as a light source. Note here that, in FIGS. 8A and 8B, a reference numeral 40 denotes a clearance between the liquid crystal display panel and the mold 1.

SUMMARY OF THE INVENTION

In the liquid crystal display module of FIGS. 8A and 8B, the liquid crystal display panel is fixed to the frame-shaped resin mold 1 by a double-faced tape 10. FIGS. 9A and 9B each show the displacement position of the double-faced tape 10.

Using the double-faced tape 10 for fixing use requires, however, some level of area good for effective bonding. Also required is flatness for the bonding surface of the frame-shaped resin mold 1, or there is a problem of poor repairability (recyclability).

In the configuration that the FPC 11 connected to a terminal portion of the liquid crystal display panel is bent and directed to the rear surface of the backlight unit, a double-faced tape 31 is used to press down the FPC 11 not to arise from the surface or bulge due to the bending repulsion (hereinafter, referred to as spring back force).

For the FPC 11 not to arise from the surface or bulge, there needs to put some thought into displacement position of the double-faced tape 31, and increases the area for taping. When the fixing force is not yet enough, a metal plate or others have to be used to cover over the FPC 11. This is the cause of preventing the liquid crystal display module from being reduced in size and profile.

The invention is proposed to solve such problems observed in the previous technology, and advantages of the invention are to provide the technology of implementing the size and profile reduction with ease for a liquid crystal display device.

These and other advantages and new features of the invention will become apparent from the following detailed description of the invention when taken in conjunction with the accompanying drawings.

The typical main disclosure of the invention is summarized as below.

1. A liquid crystal display device that includes: a liquid crystal display panel; a backlight unit disposed on the rear surface side of the liquid crystal display panel; and a flexible printed circuit whose end is connected to a terminal portion of the liquid crystal display panel. In the device, the backlight unit includes a frame-shaped mold, the liquid crystal display device includes at least a fixing member for use for fixing the liquid crystal display panel to the frame-shaped mold in an area not including a display area of the liquid crystal display panel, and the fixing member is shaped like a ring, and inside of the ring of the fixing member, the liquid crystal display panel and the frame-shaped mold are disposed.

2. According to 1, the flexible printed circuit is bent outside of the frame of the frame-shaped mold, and is partially disposed on the rear surface side of the frame-shaped mold, the flexible printed circuit is disposed in the ring of the fixing member, and the fixing member fixes, to the rear surface side of the frame-shaped mold, a bent portion of the flexible printed circuit disposed on the rear surface side of the frame-shaped mold.

3. According to 1 or 2, the fixing member is at least provided to two of the area not including the display area of the liquid crystal display panel.

4. According to any one of 1 to 3, the frame-shaped mold is formed with a notch on the side wall on one longer side, the fixing member is disposed across the notch, and with a clamping force of the fixing member, the notch is deformed, and the liquid crystal display panel is positioned on another side wall on the other longer side of the frame-shaped mold.

5. According to any one of 1 to 3, the frame-shaped mold is formed with a notch on the side wall on one shorter side, the fixing member is disposed across the notch, and with a clamping force of the fixing member, the notch is deformed, and the liquid crystal display panel is positioned on another side wall on the other shorter side of the frame-shaped mold.

6. According to any one of 1 to 3, the frame-shaped mold is formed with a notch on the side wall of one longer side, and on the side wall of one shorter side, the fixing member includes a longer-side fixing member and a shorter-side fixing member, the longer-side fixing member is disposed across the notch formed on the side wall of the one longer side of the frame-shaped mold, the shorter-side fixing member is disposed across the notch formed on the side wall of the one shorter side of the frame-shaped mold, and with a clamping force of the longer- and shorter-side fixing members, the notches formed on the side walls of the frame-shaped mold are deformed, and the liquid crystal display panel is positioned at a corner portion of the frame-shaped mold.

7. According to 6, the longer-side fixing member is provided at least two portions in the area not including the display area of the liquid crystal display panel, including an upper-side area and a lower-side area than the display area.

8. According to any one of 1 to 3, the liquid crystal display panel is provided with a conductive layer on the surface on a viewer side, the fixing member is conductive, and the fixing member is made to come in contact with the conductive layer of the liquid crystal display panel.

9. According to 8, the fixing member is made to come in contact with a predetermined terminal of the flexible printed circuit.

10. According to any one of 1 to 3, the liquid crystal display panel is provided with a semiconductor chip, the fixing member is light tight, and the fixing member is disposed to cover the semiconductor chip.

11. According to any one of 1 to 10, the fixing member is a ring-shaped elastic body.

12. According to any one of 1 to 10, the fixing member is a band-shaped clamping member.

13. According to any one of 1 to 12, the frame-shaped mold is formed with a concave portion for use for positioning the fixing member.

14. According to 13, the concave portion for use for positioning the fixing member is formed on the side surface of the frame-shaped mold.

15. According to 13, the concave portion for use for positioning the fixing member is formed on the rear surface of the frame-shaped mold.

Note here that the configurations of 1 to 15 are all just examples, and surely not restrictive.

The effects derived by any typical disclosure of the invention are summarized as below.

The liquid crystal display device of the invention easily implements size and profile reduction.

BRIEF DESCRIPTION OF THE DRAWINGS

FIGS. 2A and 2B are both a diagram for illustrating a liquid crystal display module for use for a mobile phone as an application of the invention;

DESCRIPTION OF THE PREFERRED EMBODIMENTS

Figure 1A:
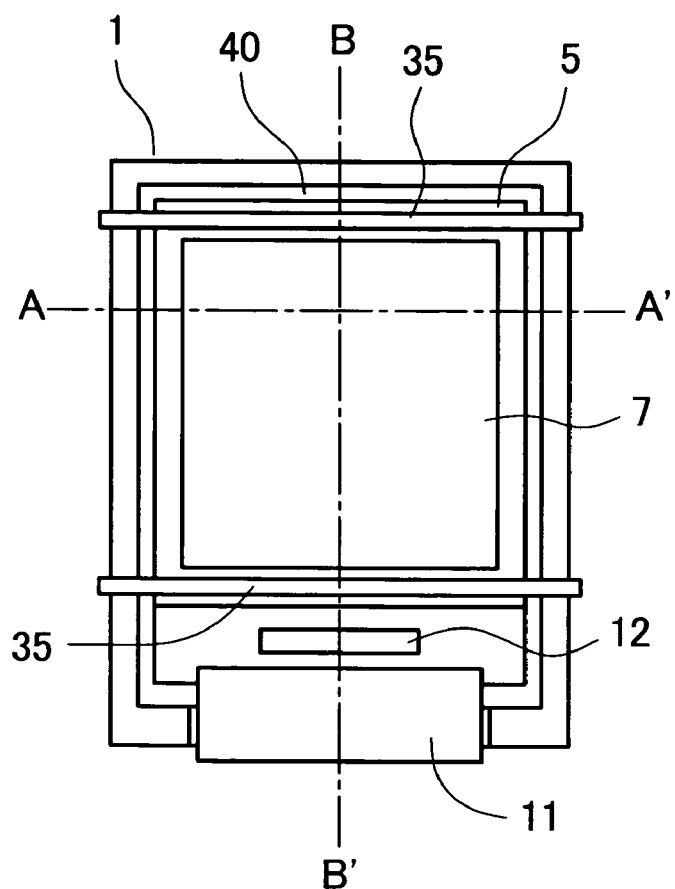
FIGS. 1A and 1B are both a diagram showing a liquid crystal display module in a first embodiment of the invention.

In the below, embodiments of the invention are described in detail by referring to the accompanying drawings.

Note that, in all of the diagrams for use for illustrating the embodiments, any component having the same function and capability is under the same reference numeral, and not described twice.

A liquid crystal display module of embodiments of the invention is a color TFT module including a small-sized liquid crystal display panel with subpixels of about 240×320×3, and is used as a display section of portable equipment, e.g., mobile phone.

Exemplary Basic Configuration of Liquid Crystal Display Module as Application of Invention FIGS. 2A and 2B are both a diagram for illustrating a liquid crystal display module for use for a mobile phone as an application of the invention. FIG. 2A is a cross sectional diagram showing the cross sectional configuration of a portion cut along a line A-A' of FIG. 1A that will be described later, and FIG. 2B is a cross sectional diagram showing the cross sectional configuration of a portion cut along a line B-B' of FIG. 1A that will be described later.

In the liquid crystal display module of FIGS. 2A and 2B, a backlight unit includes an optical sheet group 2, a light guide plate 3, a reflective sheet 4, and a white light-emitting diode 15. The optical sheet group 2 is configured by a downward diffusion sheet, two lens sheets, and an upward diffusion sheet. The reflective sheet 4 is disposed below the light guide plate 3, and the white light-emitting diode 15 is disposed on the side surface of the light guide plate 3. The backlight unit of the embodiments is configured by such components, i.e., the optical sheet group 2, the light guide plate 3, the reflective sheet 4, and the white light-emitting diode 15, which are disposed in the mold 1 with the layout shown in FIGS. 2A and 2B. Note here that the above configuration of the optical sheet group 2 is not the only possibility.

A liquid crystal display panel is configured as below. That is, glass substrates 5 and 6 are stacked together with a predetermined space therebetween. The glass substrate 6 is provided thereon with a pixel electrode, a thin film transistor, or others, and is referred also to as TFT substrate or active matrix substrate. The glass substrate 5 is formed thereon with a color filter or others, and is referred also to as opposing substrate. These substrates are then attached together using a frame-shaped sealing compound provided in the vicinity of edge portions between the substrates. The seal compound is partially formed with an aperture for injection of a liquid crystal material to inside of the seal compound between the substrates. After material injection as such, the aperture is closed, and then polarizers (7, 8) are attached to the outer surfaces of the substrates, respectively.

As such, the liquid crystal display panel has the configuration in which the liquid crystal material is sandwiched between a pair of substrates. Note that the substrates serve well as long as they are being insulated, and the material therefore is not restrictive to glass, and plastic or others are also options. The color filter may be provided not to the opposing substrate side but to the TFT substrate side. If with monochrome display, the color filter is not in need. If with a field sequential liquid crystal display device, no color filter is provided, and a three-color light source may be used as an alternative to the white light-emitting diode.

If with a TN (Twisted Nematic) or VA (Vertically Aligned) liquid crystal display panel, an opposing electrode is provided on the opposing substrate side, and is provided on the TFT substrate side if with an IPS (In-Plane Switching) liquid crystal display panel.

In the invention, when there is no need to describe the internal configuration of the liquid crystal display panel, no detailed description will be given therefor. The invention is always applicable to liquid crystal display panels irrespective of configuration.

Figure 3A:
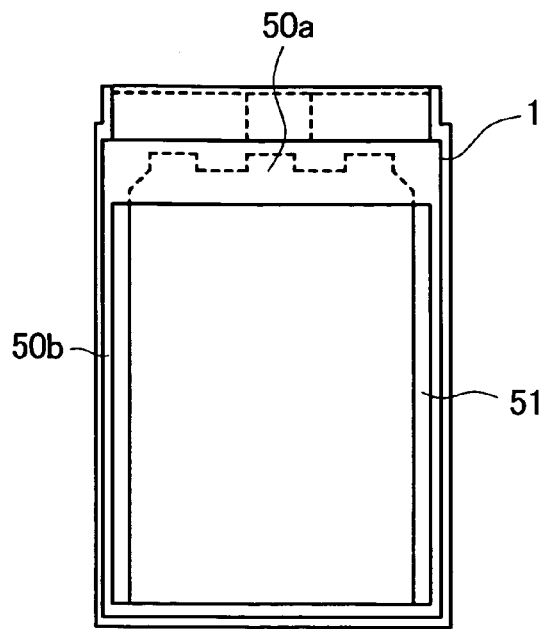
FIGS. 3A and 3B are both a diagram for illustrating an exemplary shape of a mold of FIGS. 2A and 2B.
Figure 3B:
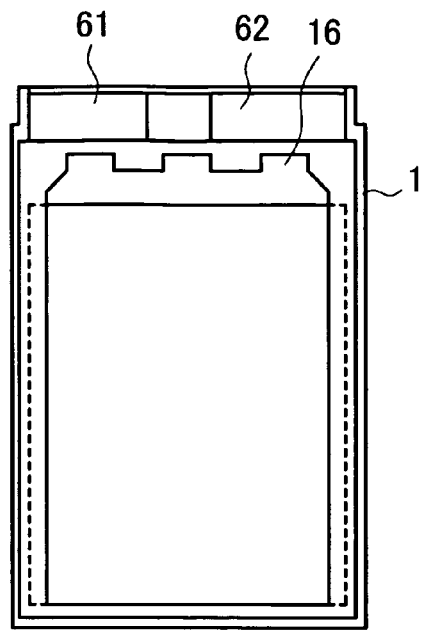

FIGS. 3A and 3B are both a diagram for illustrating an exemplary shape of the mold of FIGS. 2A and 2B. Specifically, FIG. 3A is a plan view (viewed from the side of a liquid crystal display panel, from the front surface side, or from the side of a viewer), and FIG. 3B is a bottom view.

The mold 1 of FIGS. 3A and 3B is configured with no bottom surface, and with an aperture portion at the center part, i.e., is a frame-shaped body of substantially square cross section (or tube-shaped body). With such a configuration, the reflective sheet 4 is affixed to the rear surface side of the frame-shaped mold 1 using a double-faced tape 9.

The liquid crystal display panel is supported by and fixed to, at the edge portion of the lower glass substrate 6, a height-different portion 50b formed to the mold 1.

Above the height-different portion 51 of the mold, the optical sheet group 2 is supported, and below the optical sheet group 2, the light guide plate 3 is disposed.

Below the light guide plate 3, the reflective sheet 4 is so disposed as to cover the aperture portion of the mold 1.

The end portion of the lower polarizer 8 is disposed inside of another height-different portion 51, i.e., when viewed from above, the end portion of the lower polarizer 8 is overlaid on the height-different portion 51. That is, the lower polarizer 8 is so disposed as not to overlay the height-different portions 50a and 50b. Such a configuration enables to reduce any effect possibly caused by the thickness of the lower polarizer 8, thereby favorably implementing thin profile.

As to the shorter sides of the mold, the side provided with the white light-emitting diode 15 is formed with the height-different portion 50a similarly to the height-different portion 50b. This height-different portion 50a is formed wider than the height-different portion 50b, and is formed with a backside concave portion 16 carrying therein the white light-emitting diode 15.

The light guide plate 3 is disposed more inward than the height-different portion 51. By reducing the area of the light guide plate 3 as such, the luminance per unit area can be increased.

In FIGS. 2A and 2B, the height-different portions 50a and 50b are each provided with the double-faced tape 10. For application of the invention, however, the double-faced tape 10 is not necessarily provided. If the double-faced tape 10 is provided for application of the invention, the area therefor can be reduced in size, or the double-faced tape 10 can be thinner for use because the adhesion level is not required so high.

When the FPC 11 is directed (bent) toward the rear surface side of the backlight unit for fixing, the electronic components provided on the FPC 11 can be partially housed inside of the mold 1.

That is, as shown in FIG. 3B, the mold 1 is formed with concave portions (61, 62) that open toward the lower side (rear surface side). These concave portions (61, 62) can accommodate therein at least part of the electronic components provided on the FPC 11.

First Embodiment

Figure 1B:
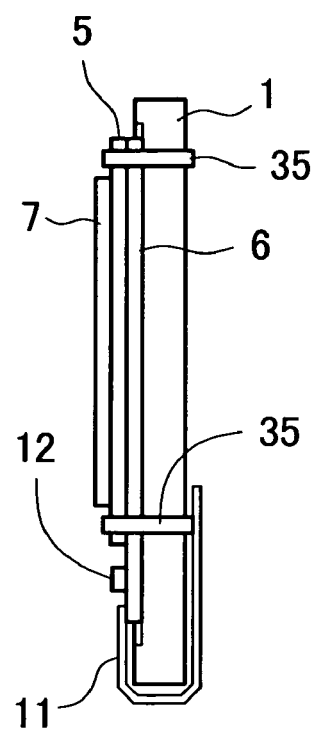

FIGS. 1A and 1B are both a diagram showing a liquid crystal display module in a first embodiment of the invention. Specifically, FIG. 1A is a plan view (viewed from the side of a liquid crystal display panel, from the front surface side, or from the side of a viewer), and FIG. 1B is a side view.

As shown in FIGS. 1A and 1B, the liquid crystal display module of this embodiment uses a fixing member 35 to fix both a liquid crystal display panel and a backlight unit at positions not including the display area of the liquid crystal display panel as if those being covered from outside. The fixing member 35 is a ring-shaped elastic body such as rubber band, or a band-shaped clamping member.

Figure 4A:
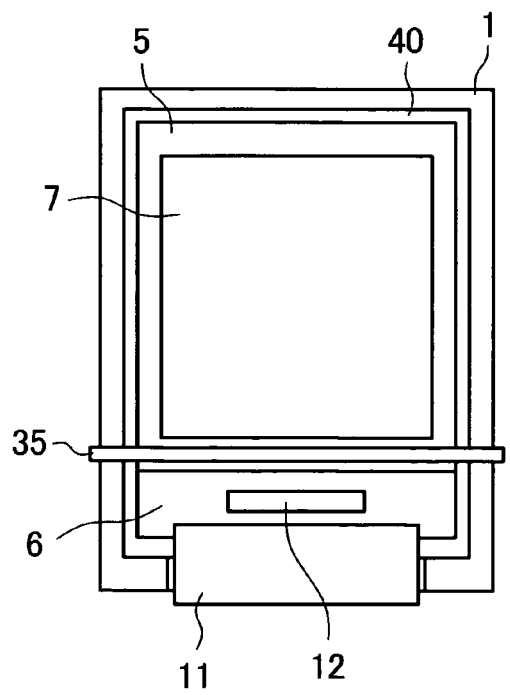
FIGS. 4A and 4B are both a diagram showing a modified example of the liquid crystal display module in the first embodiment of the invention.
Figure 4B:
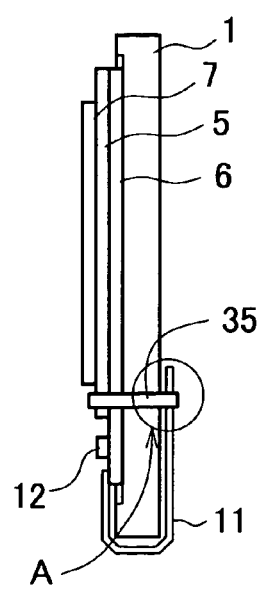
Figure 9A:
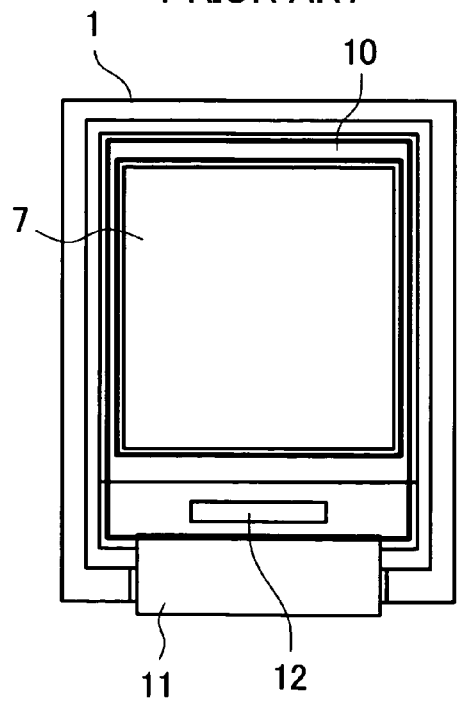
FIGS. 9A and 9B are both a diagram showing, in the liquid crystal display module of FIGS. 8A and 8B, the displacement position of a double-faced tape for use for fixing a liquid crystal display panel to a frame-shaped resin mold 1.
Figure 9B:
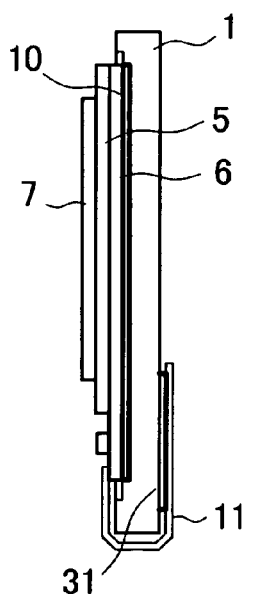

Also in this embodiment, the FPC 11 is bent and directed to the rear surface of the backlight unit for fixing to the rear surface side of the mold 1. In FIGS. 1A and 1B, the bent portion of the FPC 11 is fixed to the rear surface side of the mold 1 using a double-faced tape (31 of FIG. 9B). Alternatively, as indicated by A in FIG. 4B, the bent portion of the FPC 11 may be also fixed using the fixing member 35.

As such, in this embodiment, the fixing member 35 is used as an alternative to the double-faced tape 10 to fix the liquid crystal display panel and the backlight unit as if those being covered from outside. This accordingly eliminates the previous need for area reservation for effective bonding using the double-faced tape 10. The previous need with the double-faced tape 10 is also eliminated for flatness for the bonding surface of the resin mold 1, and the repairability (recyclability) can be successfully increased.

Because of increasing demand for a thin-profile liquid crystal display module, for the liquid crystal display panel, the glass of 0.4 or 0.3 mm thickness is taking place of the currently-popular glass of 0.5 mm thickness. Because the glass strength is reduced with the square of the glass thickness, repairing the liquid crystal display panel (peeling off the panel from the backlight unit) will be difficult if the double-faced tape 10 is used to attach the panel to the backlight unit. With this being the case, however, the present embodiment is capable of increasing the repairability (recyclability).

In the configuration that the FPC 11 connected to a terminal portion of the liquid crystal display panel is bent and directed to the rear surface of the backlight unit, the FPC 11 often arises from the surface or bulge due to the bending repulsion (hereinafter, referred to as spring back force).

The double-faced tape 31 is previously used to press down the FPC 11 not to arise from the surface or bulge. As an alternative to the double-faced tape 31, the fixing member 35 of this embodiment may be used to press down the FPC 11 from outside not to arise from the surface or bulge. If this is the case, the double-faced tape 31 may not be used, or used together with the fixing member 35.

The double-faced tape 31 is not suitable for use when the spring back force is considerably large, or to any part always exposed to the remaining stress of the constant load. On the other hand, the fixing member 35 of the embodiment is applicable to such a part always exposed to the remaining stress of the constant load.

What is more, no metal plate is in need for pressing down the FPC 11 not to arise from the surface or the bulge so that the whole of the liquid crystal display module can be reduced in weight.

Second Embodiment

Figure 10:
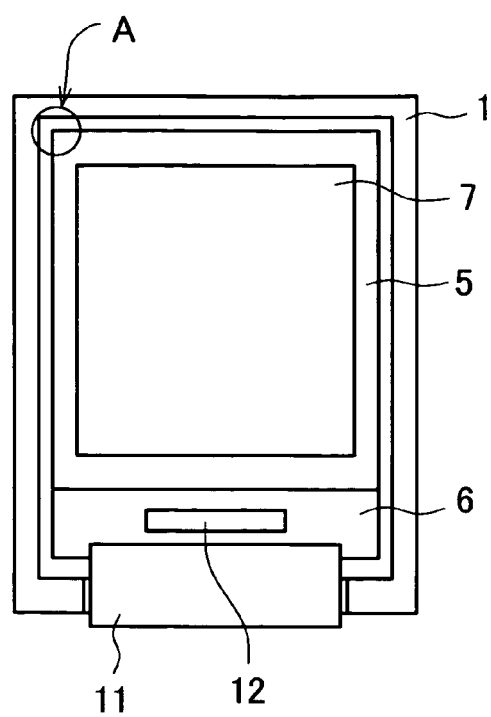
FIG. 10 is a diagram for illustrating an abutment assembly process of a previous liquid crystal display module.

For the aim of reducing the variation in the position of a display screen of the liquid crystal display panel, i.e., variation observed when the liquid crystal display panel is equipped inside of the mold, as shown in FIG. 10, the glass substrates (5, 6) of the liquid crystal display panel are made to abut corners of the frame-shaped mold 1 for assembly.

The issue here is that such abutment assembly is performed manually, and thus has the problems of the poor assembly precision, the lower side walls of the resin mold 1 around the glass substrates (5, 6), and a difficulty in assembly of corner abutment. The lower side walls of the resin mold 1 are resulted from the fact that the recent liquid crystal display module is low in profile, and the difficulty in assembly of corner abutment is resulted from the fact that the recent glass substrates (5, 6) are getting thinner. There is also a concern about safety during the abutment assembly associated with the thinner glass substrates (5, 6). That is, during the abutment assembly, fingers easily touch the corners of the glass substrates (5, 6), especially the lower right corner portion of the glass substrates for upper-left abutment assembly indicated by A of FIG. 10.

Figure 5A:
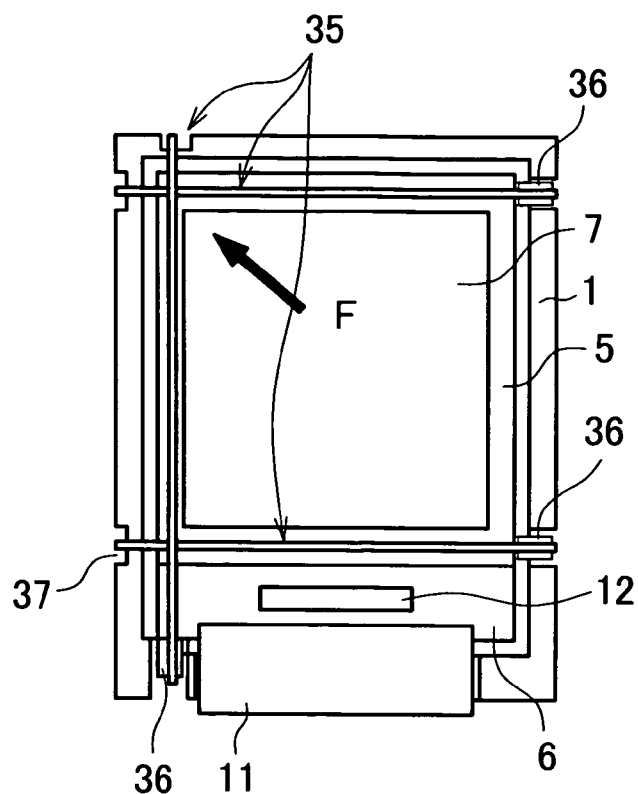
FIGS. 5A and 5B are both a diagram for illustrating a liquid crystal display module in a second embodiment of the invention.
Figure 5B:
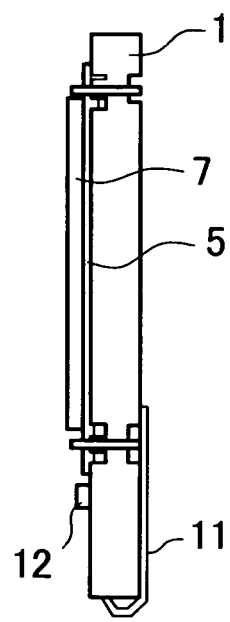

FIGS. 5A and 5B are both a diagram for illustrating a liquid crystal display module of a second embodiment of the invention. Specifically, FIG. 5A is a plan view (viewed from the side of a liquid crystal display panel, from the front surface side, or from the side of a viewer), and FIG. 5B is a side view.

Also in this embodiment, the fixing member 35 is used to fix both a liquid crystal display panel and a backlight unit as if those being covered from outside.

Figure 5C:
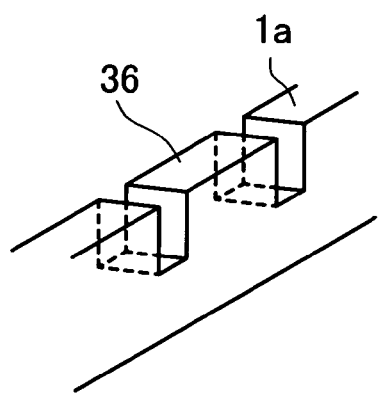
FIGS. 5C and 5D are both a diagram for illustrating a modified example in the second embodiment of the invention.

As shown in FIG. 5C, in the second embodiment, a side wall 1a of the frame-shaped mold 1 is formed with notches 36. As shown in FIG. 5A, one of the longer sides of the mold 1 is formed with two of the notches 36, and one of the shorter sides of the frame-shaped mold 1 is formed with one of the notches 36.

The fixing member 35 is disposed across these notches 36. Accordingly, in this embodiment, the clamping force of the fixing member 35 deforms the notches 36, and the liquid crystal display panel is moved and comes in contact with the corner portion of the frame-shaped mold 1 (in FIG. 5A, the upper left corner portion indicated by an arrow F). As such, the abutment assembly described above is automatically performed.

When the notch 36 is formed only to one of the longer sides of the mold 1, the liquid crystal display panel is positioned on the other longer side of the mold 1. Similarly, when the notch 36 is formed only to one of the shorter sides of the mold 1, the liquid crystal display panel is positioned on the other shorter side of the mold 1.

In the present embodiment, through fixing using the fixing member 35, the liquid crystal display panel can be aligned at the corner portion so that the positioning accuracy can be accordingly increased. What is more, using the fixing member 35 eliminates the need for abutment and allows positioning even with the lower side walls of the frame-shaped mold 1, and can be adapted for a case with the thinner liquid crystal display panel.

Figure 5D:
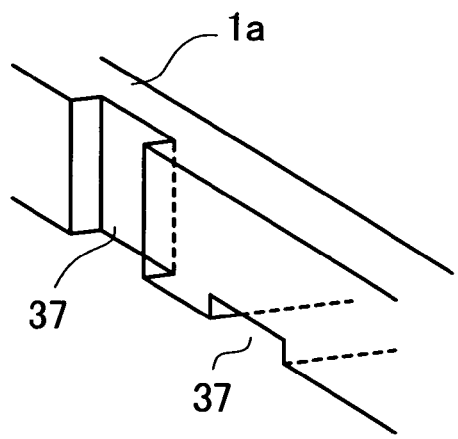

Note that, in this embodiment, as shown in FIG. 5A, the side wall 1a of the frame-shaped mold 1 is formed with a concave portion 37 for use for positioning the fixing member 35. As shown in FIG. 5D, this concave portion 37 is formed on the side surface of the side wall of the frame-shaped mold 1, or on the back surface (rear surface).

Third Embodiment

The upper polarizer 7 is attached with a protection film, and when the product is actually put into use, the protection film layer has to be peeled off. The problem here is that peeling off this protection film generates static electricity. The glass substrate 5 is charged by this static electricity, thereby resulting in unusual display of the liquid crystal display panel.

For the aim of removing the static electricity, as shown in FIGS. 1A to 11B, the glass substrate 5 configuring the liquid crystal display panel is formed thereon with a transparent conductive layer, e.g., ITO (Indium-in-Oxide). Thus formed transparent conductive layer is then electrically connected to a predetermined terminal provided on the glass substrate 6 using a conductive resin material 39.

Figure 11A:
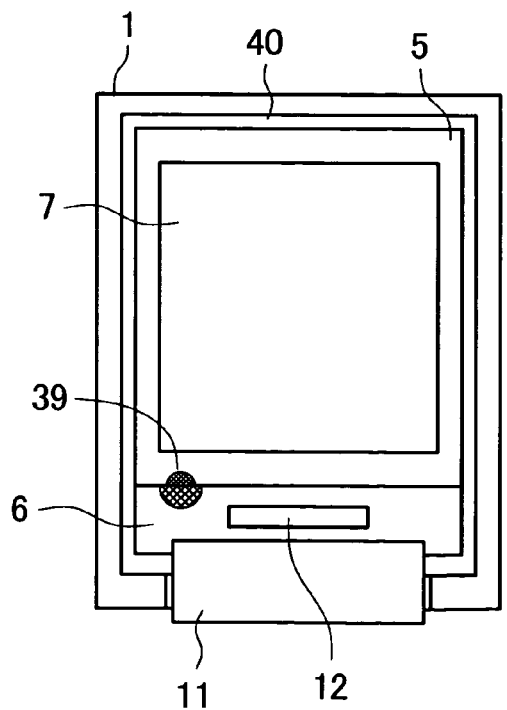
FIGS. 11A and 11B are both a diagram for illustrating a method of anti static electricity of the previous liquid crystal display module.
Figure 11B:
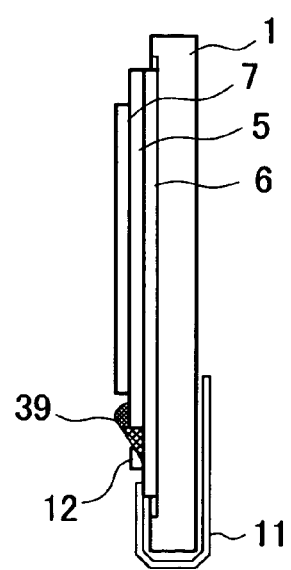

Such a liquid crystal display module of FIGS. 11A and 11B requires, however, an additional process and any device and material for the use. The coating area is also required, whereby the liquid crystal display panel is increased in size. There is also another problem of needing a larger clearance for the coating area in the device on a client side, considering the thickness or running of the coating material.

Figure 6A:
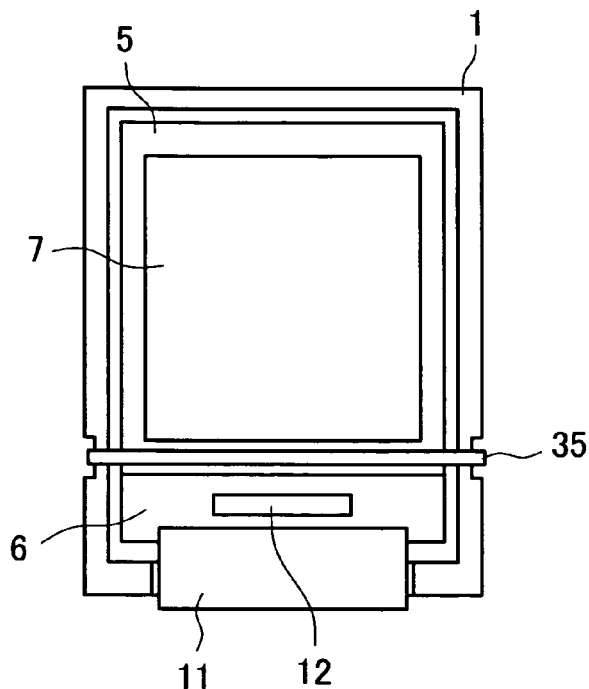
FIGS. 6A and 6B are both a diagram showing a liquid crystal display module in a third embodiment of the invention.
Figure 6B:
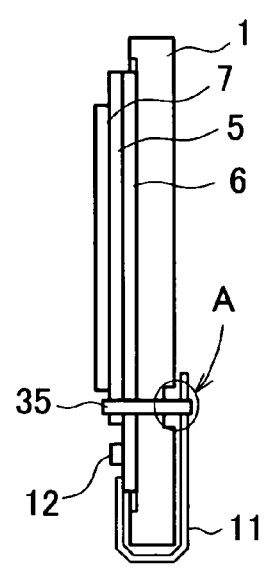

FIGS. 6A and 6B are both a diagram for illustrating a liquid crystal display module of a third embodiment of the invention. Specifically, FIG. 6A is a plan view (viewed from the side of a liquid crystal display panel, from the front surface side, or from the side of a viewer), and FIG. 6B is a side view.

Also in this embodiment, the fixing member 35 is used to fix both a liquid crystal display panel and a backlight unit as if those being covered from outside.

In this embodiment, the fixing member 35 is provided with conductivity. This fixing member 35 is made to come in contact with a transparent conductive layer (not shown) formed on the glass substrate 5 configuring the liquid crystal display panel. As indicated by A in FIG. 6A, the fixing member 35 is also made to come in contact with a predetermined terminal (not shown) of the FPC 11.

Such a configuration enables to discharge the static electricity built up when the protection film attached on the polarizer 7 is peeled off. Such electricity discharge is made via the conductive fixing member 35 and the predetermined terminal of the FPC 11 so that the liquid crystal display panel can be prevented from displaying something unusual.

What is more, in this embodiment, there is no need to any specific addition process and device, and the size of the previous liquid crystal display panel is applicable. As to the conductive area, there is no more need for a larger clearance in the device on a client side.

In this embodiment, as an IPS liquid crystal display panel, any panel of a configuration including no opposing electrode on the surface of the glass substrate 5 on the liquid crystal side is especially effective. However, such a configuration is surely not restrictive, and the configuration of including an opposing electrode on the surface of the glass substrate 5 on the liquid crystal side is also applicable.

Fourth Embodiment

A semiconductor chip is known to erroneously operate under the influence of incoming light. A semiconductor chip 12 is thus sometimes required to be light tight on the surface, and if this is the case, the semiconductor chip 12 is attached with a light tight tape.

With such a method, however, the adhesion of the tape and the like is considerably poor. This is because the surface of the semiconductor chip 12 is arisen due to coating of a resin material aiming to increase the resistance to moisture, and the area available for bonding is small in size. When the portion attached with nothing is made of a silicone material, there is a problem of a difficulty in attaching the tape not to come off.

Figure 7A:
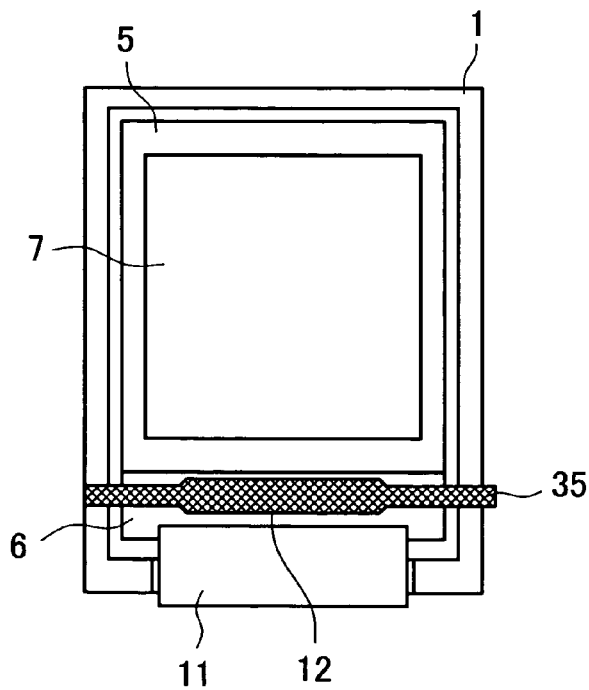
FIGS. 7A and 7B are both a diagram showing a liquid crystal display module in a fourth embodiment of the invention.
Figure 7B:
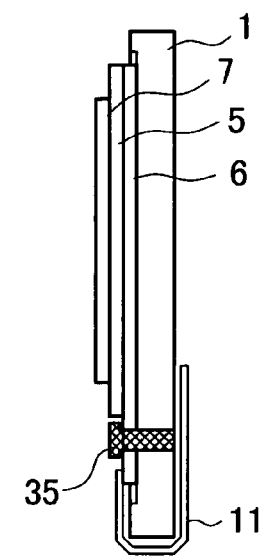
Figure 8A:
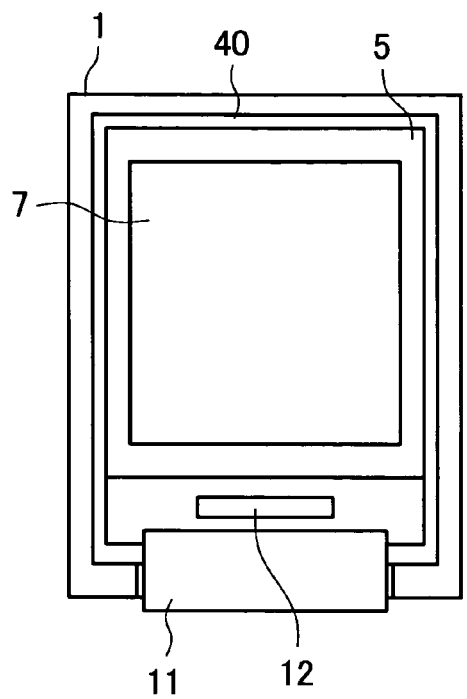
FIGS. 8A and 8B are both a diagram for illustrating a previous liquid crystal display module for use for a mobile phone.
Figure 8B:
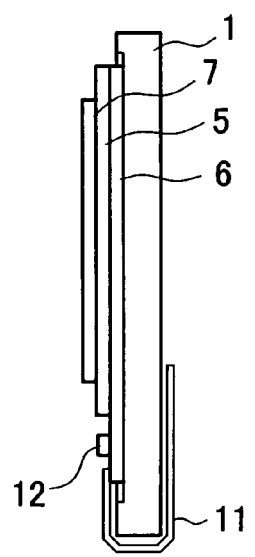

FIGS. 7A to 7B are both a diagram for illustrating a liquid crystal display module of a fourth embodiment of the invention. Specifically, FIG. 7A is a plan view (viewed from the side of a liquid crystal display panel, from the front surface side, or from the side of a viewer), and FIG. 7B is a side view.

Also in this embodiment, the fixing member 35 is used to fix both a liquid crystal display panel and a backlight unit as if those being covered from outside.

In this embodiment, the fixing member 35 is made light tight. This light-tight fixing member 35 is so disposed as to cover the surface of the semiconductor chip 12 so that the surface of the semiconductor chip 12 becomes light tight.

In this embodiment, the surface of the semiconductor chip 12 can be light tight even if it is not flat and irrespective of the material of the surface of the light-tight portion of the semiconductor chip 12.

As described above, according to the embodiment, a liquid crystal display module can be easily reduced in size and profile.

Note here that the embodiments described above may be combined as appropriate as long as no contradiction arises thereby.

The invention is not restrictive to a liquid crystal display device, and is surely applicable to other types of display device such as organic electroluminescent display devices. If with an application to voluntary-emission display devices such as organic electroluminescent display devices, there is no need for a light guide plate, a white light-emitting diode, and others.

Described in this embodiment is an exemplary case of applying the invention to the frame-shaped mold 1 with no bottom surface. This is surely not the only possibility, and the invention is applicable to a mold with a bottom surface. However, the mold with no bottom surface is considered preferable in consideration of the thickness increase by the bottom surface.

The fixing member 35 may be a tape, and may be wound around the mold once or more.

While the invention proposed by the inventors has been described in detail based on the embodiments, the foregoing description is in all aspects illustrative and not restrictive. It is understood that numerous other modifications and variations can be devised without departing from the scope of the invention.

What is claimed is:

1. A liquid crystal display device, comprising:
a liquid crystal display panel;
a backlight unit disposed on a rear surface side of the liquid crystal display panel; and
a flexible printed circuit whose an end is connected to a terminal portion of the liquid crystal display panel, wherein
the backlight unit includes a frame-shaped mold,
the liquid crystal display device includes at least a fixing member for use for fixing the liquid crystal display panel to the frame-shaped mold in an area not including a display area of the liquid crystal display panel, and
the fixing member is shaped like a ring, and inside of the ring of the fixing member, the liquid crystal display panel and the frame-shaped mold are disposed.

2. The liquid crystal display device according to claim 1, wherein
the flexible printed circuit is bent outside of a frame of the frame-shaped mold, and is partially disposed on a rear surface side of the frame-shaped mold,
the flexible printed circuit is disposed in the ring of the fixing member, and
the fixing member fixes, to the rear surface side of the frame-shaped mold, a bent portion of the flexible printed circuit disposed on the rear surface side of the frame-shaped mold.

3. The liquid crystal display device according to claim 1, wherein
the fixing member is at least provided to two of the area not including the display area of the liquid crystal display panel.

4. The liquid crystal display device according to claim 1, wherein
the frame-shaped mold is formed with a notch on a side wall on one longer side,
the fixing member is disposed across the notch, and
with a clamping force of the fixing member, the notch is deformed, and the liquid crystal display panel is positioned on another side wall on the other longer side of the frame-shaped mold.

5. The liquid crystal display device according to claim 1, wherein
the frame-shaped mold is formed with a notch on a side wall on one shorter side,
the fixing member is disposed across the notch, and
with a clamping force of the fixing member, the notch is deformed, and the liquid crystal display panel is positioned on another side wall on the other shorter side of the frame-shaped mold.

6. The liquid crystal display device according to claim 1, wherein
the frame-shaped mold is formed with a notch on a side wall of one longer side, and on a side wall of one shorter side,
the fixing member includes a longer-side fixing member and a shorter-side fixing member,
the longer-side fixing member is disposed across the notch formed on the side wall of the one longer side of the frame-shaped mold,
the shorter-side fixing member is disposed across the notch formed on the side wall of the one shorter side of the frame-shaped mold, and
with a clamping force of the longer- and shorter-side fixing members, the notches formed on the side walls of the frame-shaped mold are deformed, and the liquid crystal display panel is positioned at a corner portion of the frame-shaped mold.

7. The liquid crystal display device according to claim 6, wherein
the longer-side fixing member is provided at least two portions in the area not including the display area of the liquid crystal display panel, including an upper-side area and a lower-side area than the display area.

8. The liquid crystal display device according to claim 1, wherein
the liquid crystal display panel is provided with a conductive layer on a surface on a viewer side,
the fixing member is conductive, and
the fixing member is made to come in contact with the conductive layer of the liquid crystal display panel.

9. The liquid crystal display device according to claim 8, wherein the fixing member is made to come in contact with a predetermined terminal of the flexible printed circuit.

10. The liquid crystal display device according to claim 1, wherein the liquid crystal display panel is provided with a semiconductor chip, the fixing member is light tight, and the fixing member is disposed to cover the semiconductor chip.

11. The liquid crystal display device according to claim 1, wherein the fixing member is a ring-shaped elastic body.

12. The liquid crystal display device according to claim 1, wherein the fixing member is a band-shaped clamping member.

13. The liquid crystal display device according to claim 1, wherein the frame-shaped mold is formed with a concave portion for use for positioning the fixing member.

14. The liquid crystal display device according to claim 13, wherein the concave portion for use for positioning the fixing member is formed on a side surface of the frame-shaped mold.

15. The liquid crystal display device according to claim 13, wherein the concave portion for use for positioning the fixing member is formed on a rear surface of the frame-shaped mold.

* * * * *